United States Patent [19]
Izumi et al.

[11] Patent Number: 6,069,608
[45] Date of Patent: May 30, 2000

[54] DISPLAY DEVICE HAVING PERCEPTION IMAGE FOR IMPROVING DEPTH PERCEPTION OF A VIRTUAL IMAGE

[75] Inventors: Gaku Izumi, Tokyo; Shiho Onishi, Kanagawa, both of Japan

[73] Assignee: Sony Corporation, Tokyo, Japan

[21] Appl. No.: 08/982,028

[22] Filed: Dec. 1, 1997

[30] Foreign Application Priority Data

Dec. 3, 1996 [JP] Japan ................................. 8-322427

[51] Int. Cl.⁷ .............................. G09G 5/36; G09G 5/00; G02B 27/22

[52] U.S. Cl. .............................. 345/139; 345/8; 359/462; 359/477

[58] Field of Search .................................. 345/7, 8, 9, 32, 345/113, 114, 139, 419, 422; 348/42, 51, 52; 349/15; 351/201; 352/86; 359/13, 458, 462, 466, 470, 472, 477, 620–634

[56] References Cited

U.S. PATENT DOCUMENTS

| | | | |
|---|---|---|---|
| 5,162,787 | 11/1992 | Thompson et al. | 345/32 |
| 5,214,419 | 5/1993 | Demond et al. | 345/32 |
| 5,451,976 | 9/1995 | Ito | 345/8 |
| 5,491,510 | 2/1996 | Gove | 345/8 |
| 5,515,076 | 5/1996 | Thompson et al. | 345/139 |
| 5,579,026 | 11/1996 | Tabata | 345/8 |
| 5,589,980 | 12/1996 | Bass et al. | 359/478 |
| 5,598,297 | 1/1997 | Yamanaka et al. | 359/462 |
| 5,612,709 | 3/1997 | Sudo et al. | 345/8 |
| 5,691,843 | 11/1997 | Oneill | 359/464 |
| 5,781,165 | 7/1998 | Tabata | 345/8 |
| 5,870,068 | 2/1999 | Hildebrand et al. | 345/8 |
| 5,896,226 | 4/1999 | Peuchot et al. | 359/472 |

FOREIGN PATENT DOCUMENTS

| | | |
|---|---|---|
| 0 344 881 | 2/1989 | European Pat. Off. . |
| 0 385 705 A2 | 2/1990 | European Pat. Off. . |
| 0 640 859 A2 | 8/1994 | European Pat. Off. . |

OTHER PUBLICATIONS

C. Hendrix and W. Barfield: "Relationship between monocular and binocular depth cues for judgements of spatial information and spatial instrument design" Displays, vol. 16, No. 3, 1995, pp. 103–113.

*Primary Examiner*—Steven J. Saras
*Assistant Examiner*—Paul A. Bell
*Attorney, Agent, or Firm*—Ronald P. Kananen; Rader, Fishman & Grauer

[57] ABSTRACT

A audiovisual program image is displayed on a display panel, and the audiovisual program image is enlarged by a lens and then incident to the eye balls of a user, whereby the virtual image corresponding to the audiovisual program image is observed on the eye balls of the user. Further, a perception image to make the user perceive the distance to the virtual image corresponding to the audiovisual program image and the size of the virtual image is displayed at the surrounding portion of the display portion of the audiovisual program image on the display panel, and the perception image is also enlarged by the lens and then incident to the eye balls of the user, whereby the virtual image corresponding to the perception image can be observed on the eye balls of the user.

10 Claims, 20 Drawing Sheets

VIRTUAL IMAGE
VISUAL DISPLAY DEVICE

LIGHT SHIELDING FILM

USER

USER

VIRTUAL IMAGE
VISUAL DISPLAY DEVICE

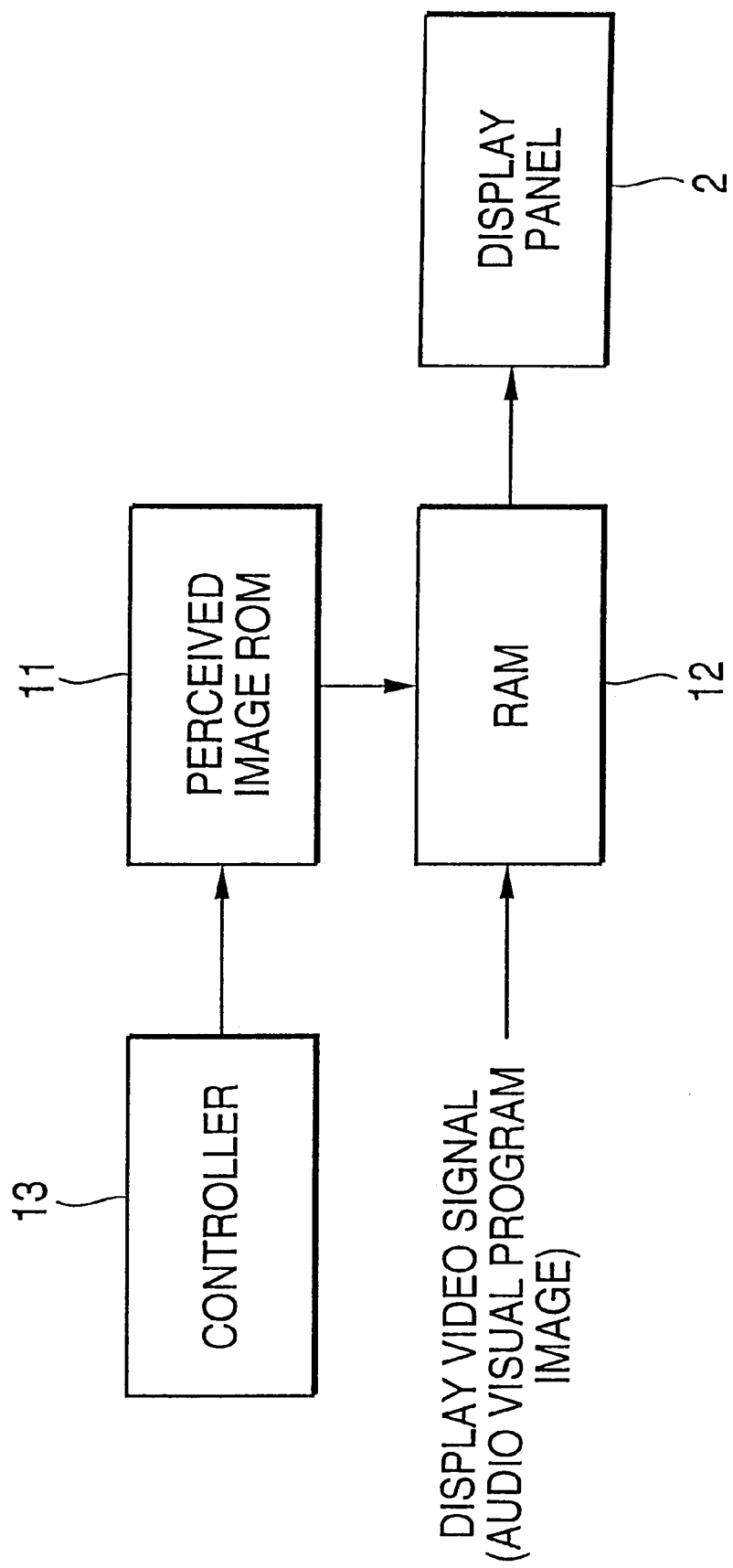

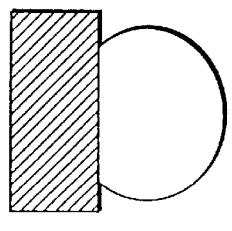
FIG. 15C
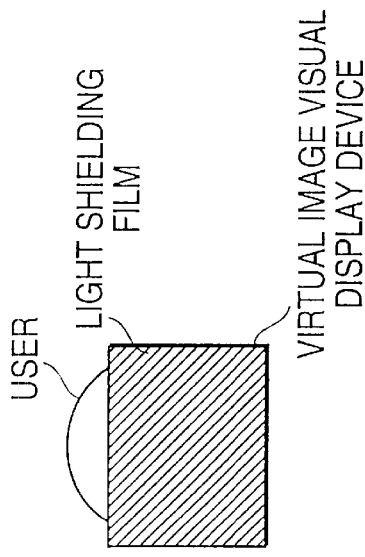
FIG. 15B
FIG. 15D
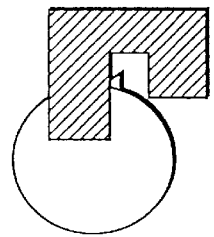
FIG. 15E
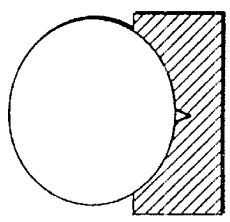
FIG. 15A

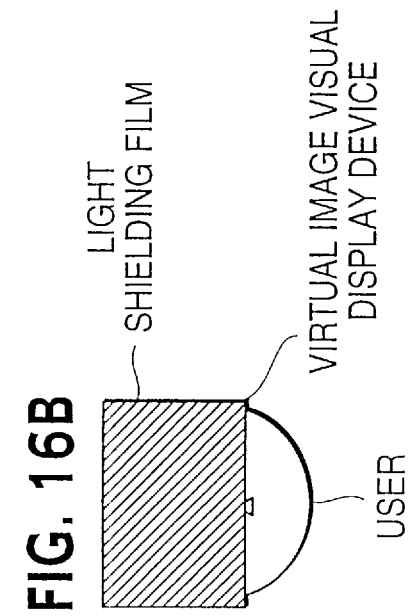
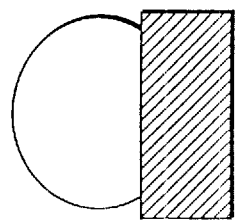
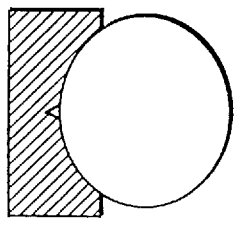
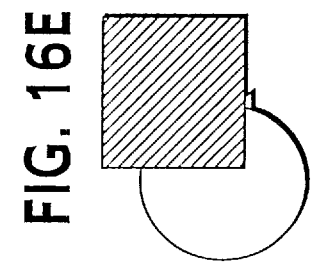
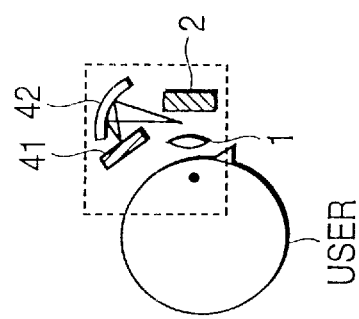

DISPLAY DEVICE HAVING PERCEPTION IMAGE FOR IMPROVING DEPTH PERCEPTION OF A VIRTUAL IMAGE

BACKGROUND OF THE INVENTION

1. Field of the Invention

The present invention relates to a display device and a display method, and particularly to a display device and a display method by which both a virtual image corresponding to an image to be viewed by a user and a virtual image corresponding to a perception image to make the user perceive the distance to the virtual image and/or the size of the virtual image are formed to enhance the realism which is obtained by observing the virtual image.

2. Description of the Related Art

Recently, there has been implemented a virtual image viewing display device which is adapted to supply a virtual image to a user, such as a HMD (Head Mount Display).

Here, when an object is located at a position nearer to the lens than the focus distance, a virtual image is formed at the object side. The virtual-image forming principle is described in detail in "Introduction to Science of Lens (First Volume)" written by Toshio Ogura issued by Asahi Sonorama Company, "Optics" written by Kazumi Murata issued by Science Company, etc.

The adjustment condition of the convergence and focus of both eyes, the size (visual angle, angle of view) of the image (image on retina) of the object, etc. are considered as factors which make a human perceive the position of an object (the distance to the object) and the size of the object in the space.

Therefore, a virtual image visual display device may be considered as being designed to form a virtual image with realism on the basis of these factors.

That is, FIG. 1 is a top view showing the construction of the virtual image visual display device for forming a virtual image with realism on the basis of the above factors.

Each of display panels 2L and 2R comprises a liquid crystal device or the like, and images for the left eye and right eye are displayed on the respective panels. Light from the image displayed on the display panel 2L or 2R is incident to a lens 1L or 1R to be enlarged, and then incident to the left eye or right eye of a user. The display panel 2L or 2R is located nearer to the lens 1L or 1R than the focus distance of the lens 1L or 1R (at a position nearer to the lens 1L or 1R), whereby virtual images obtained by enlarging the images in the lenses 1L and 1R respectively are observed by the left eye and the right eye of the user respectively.

The virtual image visual display device shown in FIG. 1 has the lens 1L serving as an optical system for the left eye and the lens 1R serving as an optical system for the right eye. That is, it has two optical axes, and thus it is called a two-optical-axis type (device, on the other hand, a one-optical-axis type device is defined by a device in which an image displayed on one display panel is enlarged by one lens to form a virtual image, and then the virtual image is observed by one eye or both eyes.

In the two-optical-axis type of virtual image visual display device, the distance from a user at which the virtual image is observed by the left eye or right eye of the user (the position at which the virtual image is formed) (virtual image imaging position) can be varied on the basis of the positional relationship between the lens 1L and the display panel 2L and the positional relationship between the lens 1R and the display panel 2R.

Accordingly, the adjustment condition of the convergence and focus of both eyes can be varied by adjusting the positional relationship between the lens 1L and the display panel 2L and the positional relationship between the lens R and the display pane 2R, thereby allowing the use to perceive the position of the virtual image (the distance from the user to the virtual image).

Further, as shown in FIG. 2, when the size of the retina image is fixed, the user perceives that the virtual image is larger as the distance to the virtual image becomes longer. Accordingly, the size of the virtual image which is perceived by the user can be varied by adjusting the positional relationship as described above to vary the position at which the virtual image is formed. Conversely, when the distance to the virtual image is fixed, the size of the virtual image which is perceived by the user can be varied by varying the size of the retina image.

As one type of virtual image visual display devices has been known a see-through type in which incidence of external light is allowed. In this case, the user can observe not only the virtual image (virtual image frame and virtual image space), but also the outside scene outside condition and real space). Therefore, there is a case where no virtual image with realism is obtained in accordance with the environment of the real space.

That is, the position and size of an object in the space which are perceived by the human is greatly affected by not only the convergence and focus adjustment condition of both the eyes and the size of the retina image, but also the effect based on visual psychology. That is, in the case where the virtual image space can be seen together with the real space, the psychological effect which is obtained by comparing an object existing in the real space and its virtual image has a great effect on the position and the size of the virtual image which is perceived by the user.

Specifically, for example, as shown in FIG. 3, when an object (obstacle) existing in the real space is located between the user and the virtual image, the user may originally see the overall obstacle as shown in FIG. 4A because the obstacle is located in front of the virtual image.

However, in the virtual image visual display device shown in FIG. 1, the visual field is intercepted by the images created with the display panels 2L and 2R, so that the obstacle located in the intercepted range is not seen as shown in FIG. 4B.

As described above, there occurs such a phenomenon that the obstacle located in front of the virtual image is hidden behind the virtual image and thus it cannot be seen, which is impossible in the real space. Accordingly, the position and size of the virtual image cannot be accurately perceived due to the above inconsistency, so that the virtual image with realism may not be obtained.

Therefore, there is a method of intercepting the outside light to the virtual image visual display device to prevent the user from seeing the external scene (real space). However, since the external light is intercepted to avoid use of the psychological effect which greatly affects the position and size of the object perceived by the human, that is, the object which is to be compared with the virtual image is hidden, the position and size of the virtual image is not accurately perceived, so that no virtual image with realism is obtained.

SUMMARY OF THE INVENTION

The present invention has been implemented in view of the foregoing condition, and has an object to provide a display device and a display method which enable a user to perceive the position and size of a virtual image accurately to obtain a virtual image with realism.

In order to attain the above object, a display device according to a first aspect of the present invention is characterized by including storage means for storing a perception image to make a user perceive the distance to a virtual image corresponding to a reception image and/or the size of the virtual image, and an enlarging optical system for enlarging the reception image displayed on display means to form the virtual image and also forming the virtual image corresponding to the perception image.

Further, in order to attain the above object, a display method according to a second aspect of the present invention is characterized by comprising the step of forming a virtual image corresponding to a perception image to make a user perceive the distance to a virtual image corresponding to a reception image and/or the size of the virtual image.

According to the display device of the first aspect of the present invention, the storage means stores the perception image to make the user perceive the distance to the virtual image corresponding to the reception image and/or the size of the virtual image, and the enlarging optical system forms the virtual image corresponding to the perception image.

According to the display method of the second aspect of the present invention, there is formed the virtual image corresponding to the perception image to make the user perceive the distance to the virtual image corresponding to the reception image or the size of the virtual image.

BRIEF DESCRIPTION OF THE DRAWINGS

FIG. 8 is a block diagram showing an electrical construction of the virtual image visual display device shown in FIG. 1;

FIGS. 15A to 15E are a sectional view and outlook views (rear, top, bottom and side views) showing the virtual image visual display device of FIG. 13;

FIGS. 16A to 16E are a sectional view and outlook views showing a fifth embodiment of the virtual image visual display device to which the present invention is applied;

DETAILED DESCRIPTION OF THE PREFERRED EMBODIMENTS

A preferred embodiment according to the present invention will be described hereunder with reference to the accompanying drawings.

Figure 6:
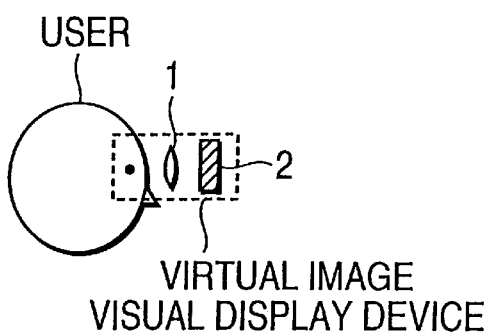
FIG. 6 is a sectional view showing the virtual image visual display device shown in FIG. 1.

FIG. 5 shows the outline construction of a first embodiment of a virtual image visual display device to which the present invention is applied, and FIG. 6 is a cross-sectional view showing the right-hand surface thereof.

As shown in FIG. 5, the virtual image visual display device is covered by a light-shielding film for shielding light (a hatched portion in the figure), whereby a user cannot see the real space (outside environment, scene) while the virtual image visual display device is used.

Figure 1:
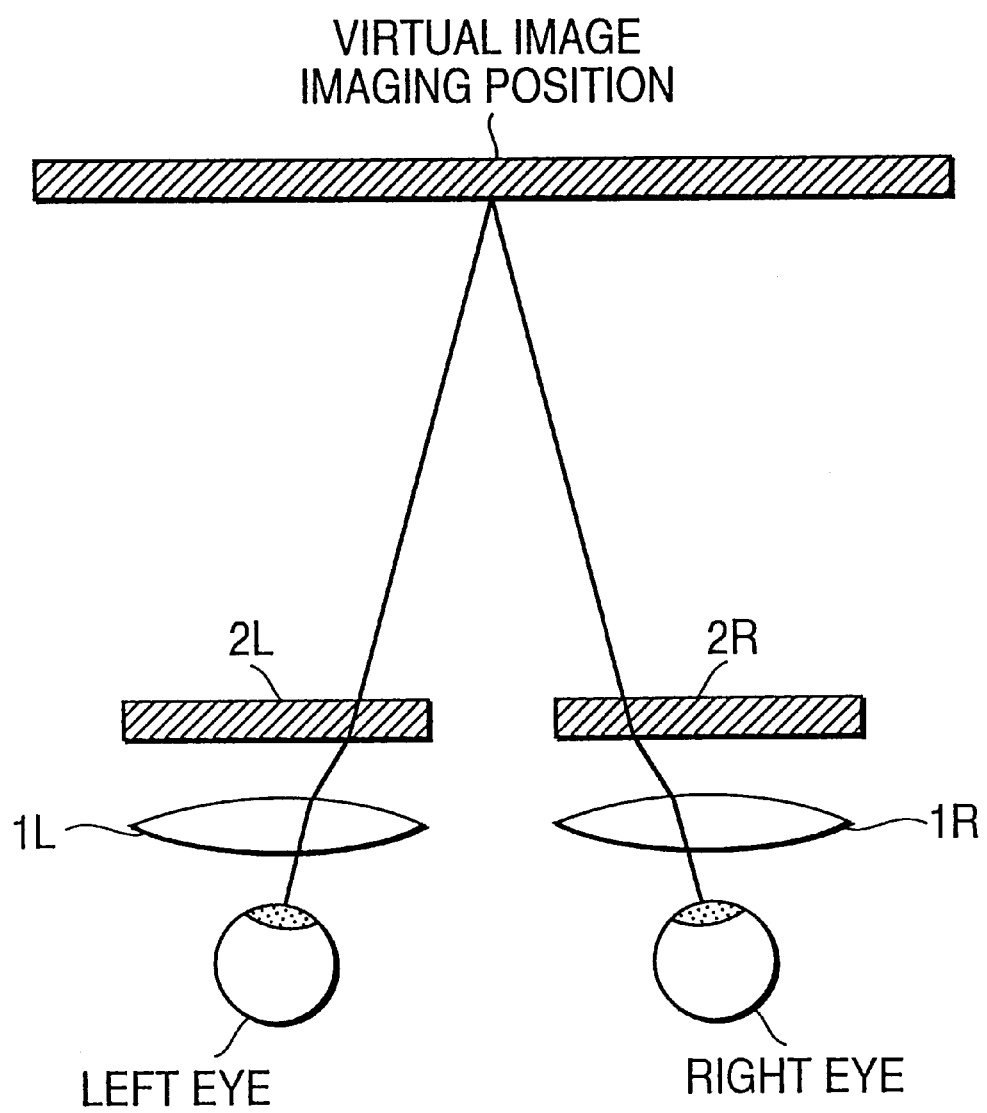
FIG. 1 is a sectional view of the upper face showing an optical construction of a two-optical-axis type virtual image visual display device.
Figure 2:
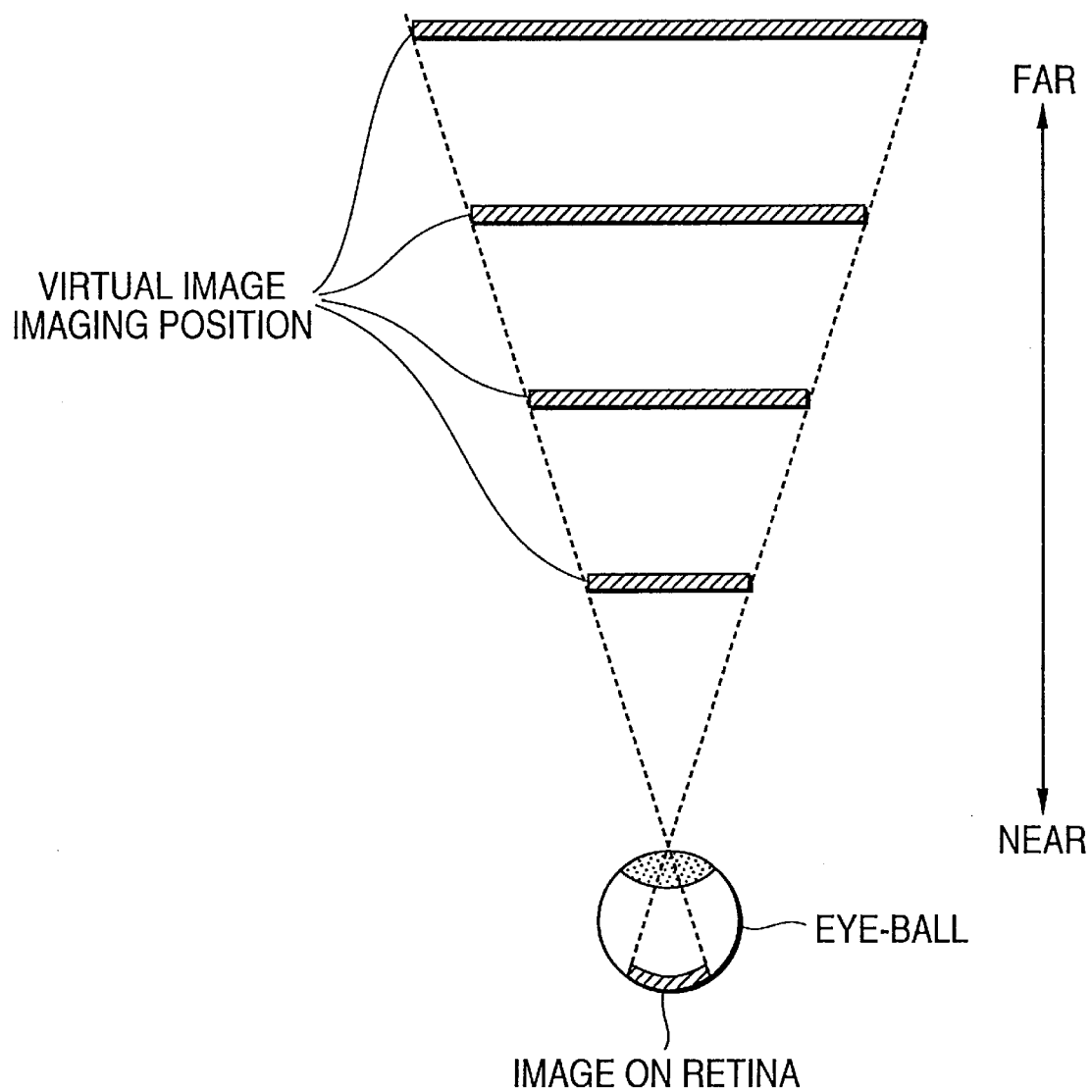
FIG. 2 is a diagram showing the relationship between the size of an image on the retina and the distance to the virtual image.
Figure 3:
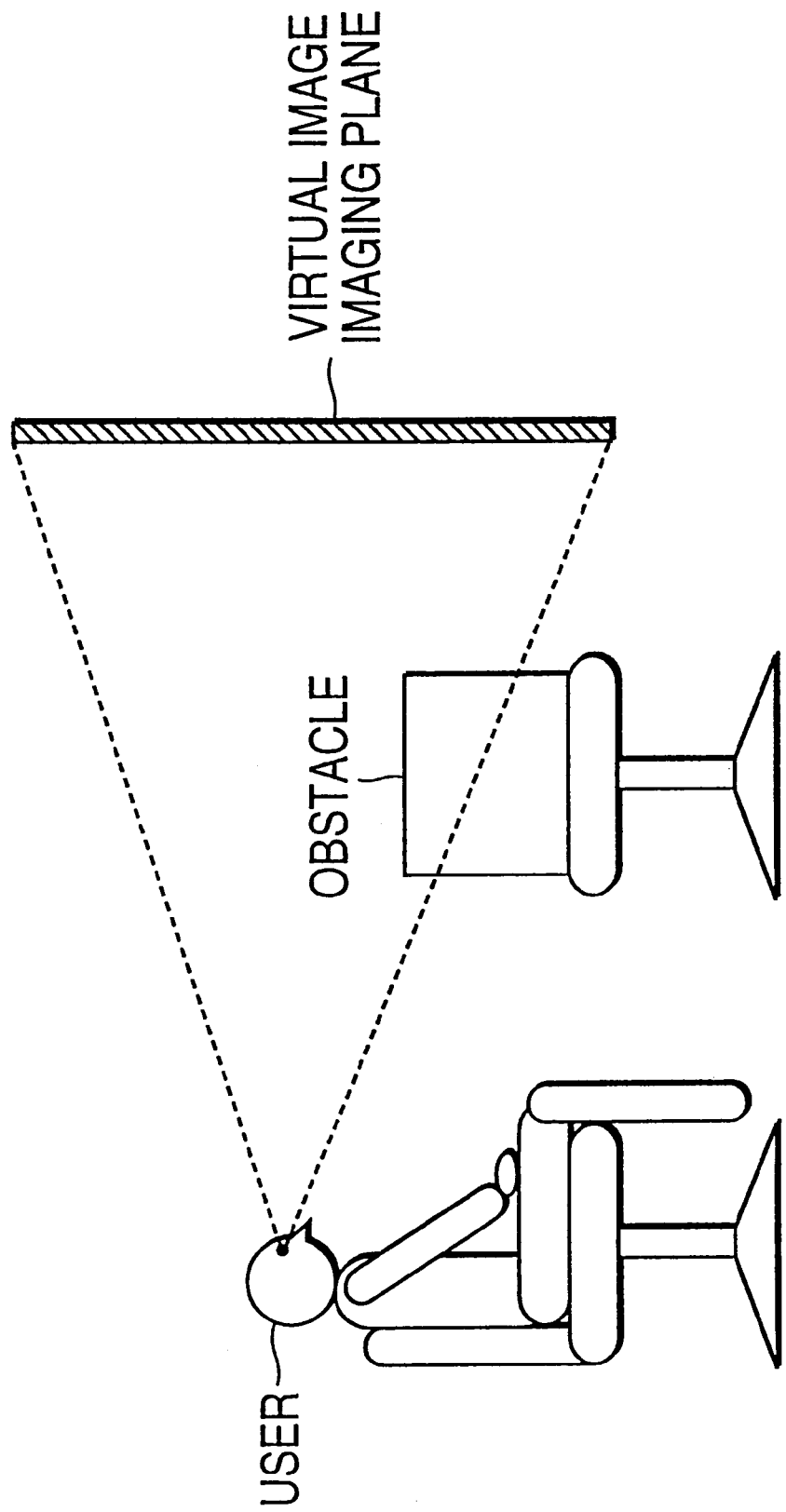
FIG. 3 is a diagram showing the state where an obstacle existing in the real space is located between a user and a virtual image.

The optical construction of the virtual image visual display device (FIG. 6) is the same as that of FIG. 1, and thus the description thereof is omitted.

FIGS. 7A to 7D show use modes of the virtual image visual display device.

Figure 7A:
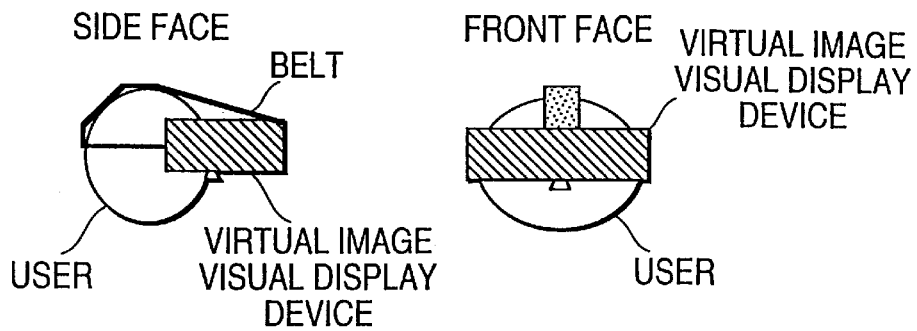
FIGS. 7A to 7D are diagrams showing use modes of the virtual image visual display device of FIG. 1.
Figure 7B:
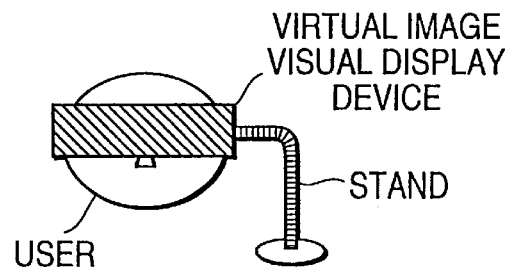
Figure 7C:
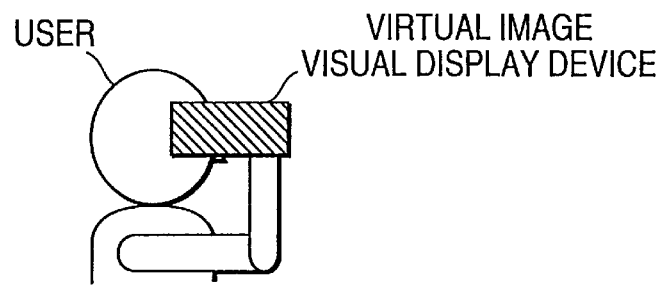
Figure 7D:
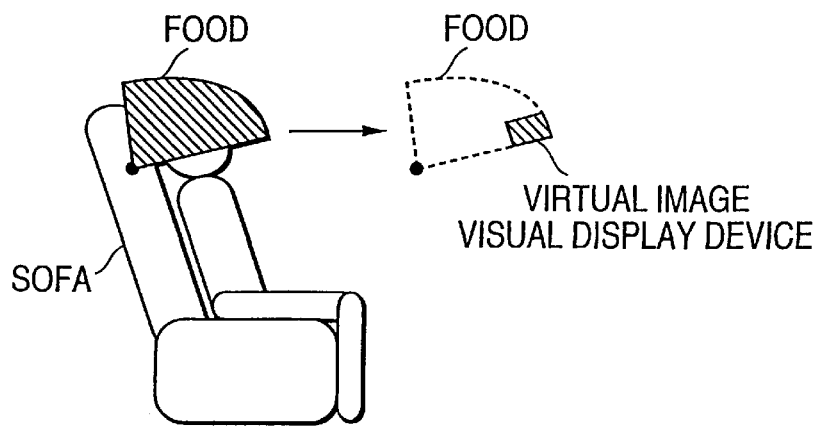

As shown in FIG. 7A, the virtual image visual display device is provided with a belt which is mounted on the user's head, whereby it can be used while mounted on the head. Further, as shown in FIG. 7B, the virtual image visual display device is fixed to a stand or the like, whereby the user can use it as if the user has a peek at it. Still further, as shown in FIG. 7C, the virtual image visual display device may be designed in a compact size so that it is convenient for portability and it can be used while held by the hand of the user. Still further, as shown in FIG. 7D, the virtual image visual display device may be used in such a manner that a rotatable hood is secured to a sofa or the like so as to cover the head portion of the user, and the virtual image visual display is fixed therein. However, in this case, outside hood is preferably designed to shield the light.

The use mode shown in FIGS. 7A to 7D are examples, and no limitation is imposed on the use mode of the virtual image visual display device.

Next, FIG. 8 shows an electrical construction of the first embodiment of the virtual image visual display device.

In a perception image ROM (Read Only Memory) 11 (storage means) are stored the data of perception images which are images suitable for make a user perceive the distance to a virtual image and the size of the virtual image. Specifically, the perception images are stored as images of humans, specific plants and animals, cigarette boxes, etc. whose size in the real space is experientially recognized and whose size is substantially constant even when anyone sees it anywhere, so that upon comparison with a virtual image, the distance to the virtual image and the size of the virtual image can be perceived. The perception image ROM 11 stores perception images of various sizes even when the perception images are identical.

A RAM (Random Access Memory) 12 receives an image to be viewed by a user such as an image signal (display video signal) output from a tuner or reproducing device (not shown) (for example, movie or the like) (hereinafter suitably referred to as "audiovisual program image") (reception signal) to temporarily store the image therein, and then outputs it to the display panel 2 (2L and 2R) (display means). The RAM 12 also temporarily stores a perception image read out from the perception image ROM 11 to output it to the display panel 2.

A controller 13 controls the read-out of the perception image data from the perception image ROM 11.

In the virtual image visual display device thus constructed, the data of the audiovisual program image is supplied to and stored into the RAM 12 on a frame basis (one frame or one field).

The storage capacity of the RAM 12 is set to be larger than the data amount of one frame of the audiovisual program image. That is, for example when lateral× longitudinal of one frame of the audiovisual program image is constructed by 640×480 pixels, the RAM 12 has a capacity enough to store the data of 800×600 pixels, for example.

In the RAM 12, the data of the audiovisual program image of one frame are stored at such an address that the image of the data is displayed in a predetermined range (hereinafter suitably referred to as "audiovisual program range") such as a center portion of the display panel 2.

Further, the controller 13 selects the data of a perception image whose size is optimum to perceive the distance to the virtual image corresponding to the audiovisual program image supplied to the RAM 12 and the size of the virtual image out of the perception images stored in the perception image ROM 11 (hereinafter suitably referred to as optimum perception image).

That is, for example, when the user operates the controller 13 on the basis of the distance to the virtual image corresponding to the audiovisual program image and the size thereof, the optimum perception image is selected in the controller 13 in accordance with the operation. Further, the data of the audiovisual program image contains the distance to the virtual image corresponding to the image and the size thereof, for example, and the controller 13 selects the optimum perception image according to this information. Alternatively, the position at which the virtual image is formed is determined on the basis of the positional relationship between the lens 1 (enlarging optical system) and the display panel 2 as described above, so that the controller 13 selects the optimum perception image on the basis of the positional relationship.

The data of the optimum perception image which is selected by the controller 13 are read out from the perception image ROM 11, and supplied to the RAM 12. In the RAM 12, the data of the optimum perception image are stored at an address of an area other than the audiovisual program range in the storage area. That is, the data are stored at such an address as to be displayed at the right and left sides of the audiovisual program image in the display panel 2. However, a part or all of the optimum perception image data may be stored at such an address as to be displayed while superimposed on the audiovisual program image on the display panel 2.

The data of the audiovisual program image and the optimum perception image which are stored in the RAM 12 are read out therefrom, and supplied to the display panel 2, whereby the audiovisual program image is displayed at the center portion in the display panel 2 and the optimum perception image is displayed at the right and left sides.

Figure 9:
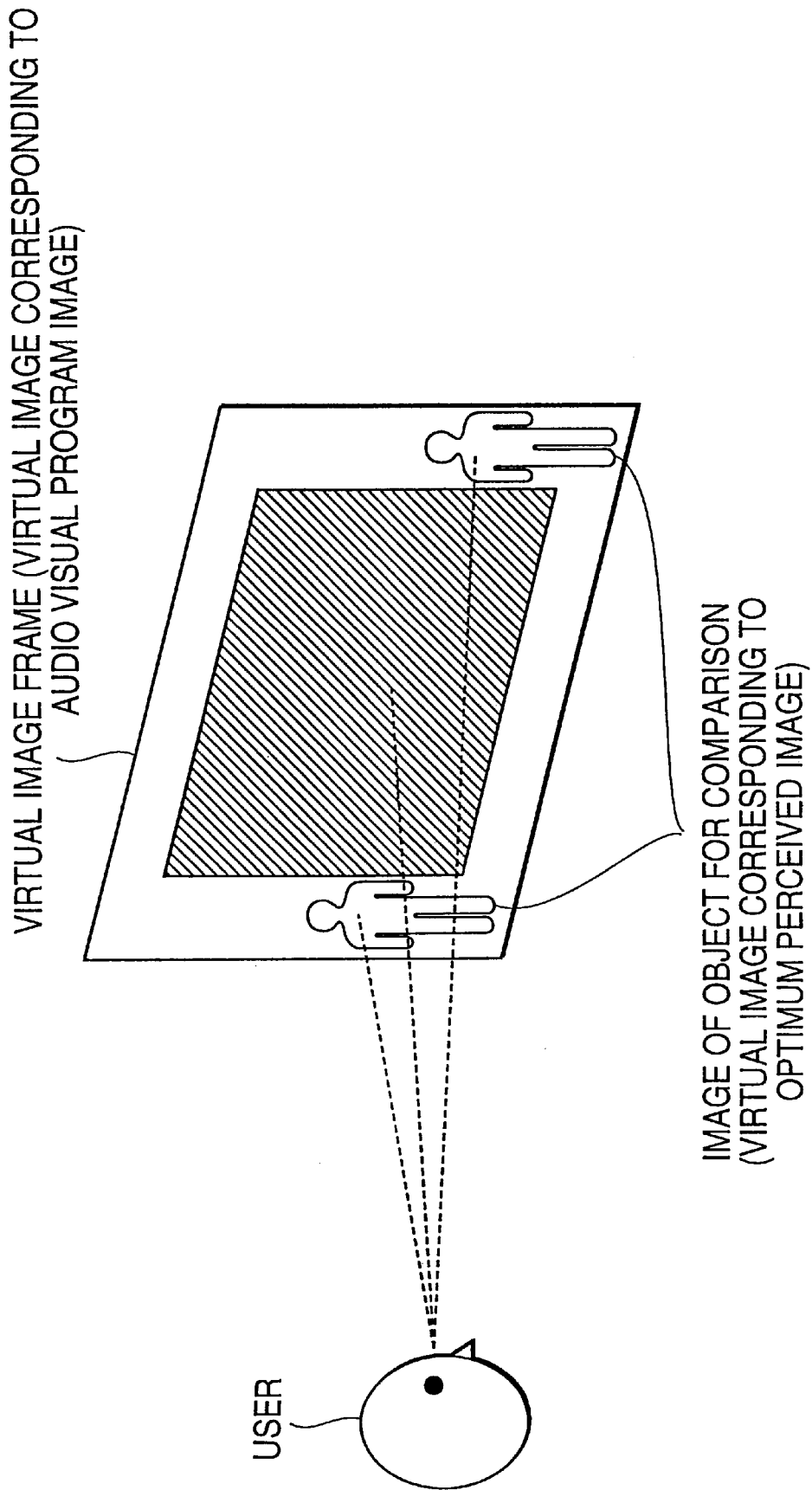
FIG. 9 is a diagram showing an virtual image which can be observed by the virtual image visual display device shown in FIG. 1.

The image displayed on the display panel 2 is enlarged by the lens 1 and then incident to the eye balls of the user as described above, whereby the virtual image corresponding to the optimum perception image as well as the virtual image corresponding to the audiovisual program image is observed as shown in FIG. 9.

Accordingly, the user compares the audiovisual program image with the optimum perception image to accurately perceive the position and size of the virtual image corresponding to the audiovisual program image on the basis of the visual psychological effect which can be obtained through the comparison, so that the user can enjoy a virtual image with realism.

As a perception image can be used an image which is obtained by a method of representing depth based on a perspective representation method, tone gradation or the like. In this case, the user can also accurately perceive the position and size of the virtual image corresponding to the audiovisual program image on the basis of the psychological effect due to the depth obtained by the perception image. The perception image may be a moving picture or a still picture.

In the case where the perception image is a moving picture, if the moving picture is set to provide depth by the perspective representation method (for example, a moving picture which displays a star streaming from the peripheral portion to the center provides such depth that the star streams from the user side to the virtual image), the position and size of the virtual image corresponding to the audiovisual program image can be accurately perceived by the user by the psychological effect due to the depth. However, when the perception image is a moving picture, the data of the perception image stored in the RAM 12 are required to be written in conformity with the motion of the moving picture.

On the other hand, when the perception image is a still picture, after the data of the perception image are temporarily written into the RAM 12, it is unnecessary to rewrite the data of the perception image unless the device is re-powered or the perception image is replaced by another. Accordingly, in this case, it is sufficient to merely rewrite the data of the audiovisual program image.

When the virtual image corresponding to the perception image is displayed together with the virtual image corresponding to the audiovisual program image, it may be considered that the perception image attracts the user's attention and thus the user cannot concentrate on or get himself into the audiovisual program image.

Figure 10:
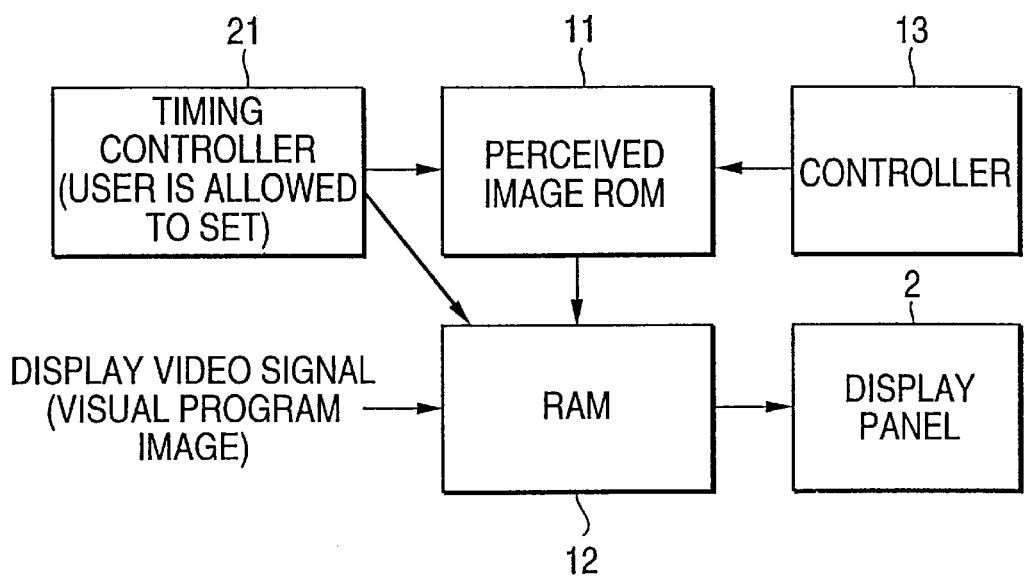
FIG. 10 is a block diagram showing an electrical construction according to a second embodiment of the virtual image visual display device to which the present invention is applied.

FIG. 10 shows the construction of a second embodiment of the virtual image visual display device to which the present invention is applied. In FIG. 10, the corresponding parts to FIG. 8 are represented by the same reference numerals. That is, the virtual image visual display device is designed in the same construction as FIG. 8 except that a timing controller 21 is newly provided.

The timing controller 21 (control means) controls the timing of reading out the data of the optimum perception image from the perception image ROM 11 and writing the data into the RAM 12 (hereinafter suitably referred to as write-in timing). Further, the timing controller 21 also carries out the control operation for a period for which the data of the optimum perception image are stored in the RAM 11 (hereinafter suitably referred to as storage period).

The write-in timing and the storage period can be set by operating the timing controller 21 by the user, for example. Further, the write-in timing and the storage period may be superimposed on the data of the audiovisual program image, for example.

In the virtual image visual display device thus constructed, when the user sets the write-in timing and storage period by operating the timing controller 21, the timing controller 21 reads out the data of the optimum perception image from the perception image ROM 11 according to the write-in timing and writes the data into the RAM 12. Thereafter, when the storage period elapses, the write-in operation of the data of the optimum perception image into the RAM 12 is stopped, and the data of the optimum perception image which has been already in the RAM 12 is deleted.

Accordingly, in this case, the virtual image corresponding to the optimum perception image is formed (exhibited) for only the storage period from the write-in timing, and thus the user can observe the virtual image corresponding to the optimum perception image for only a desired time from a desired time, so that it can be prevented that the user cannot concentrate on or immerse himself/herself into the audiovisual program image.

Figure 4B:
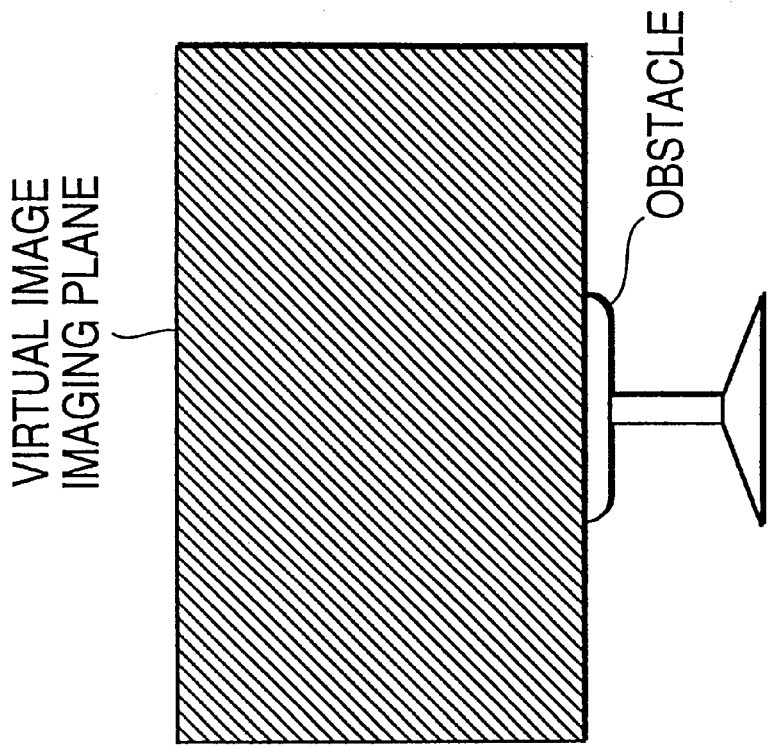
FIGS. 4A and 4B are diagrams showing a case where an obstacle can be seen in front of a virtual image and a case where an obstacle cannot be seen in front of the virtual image.
Figure 4A:
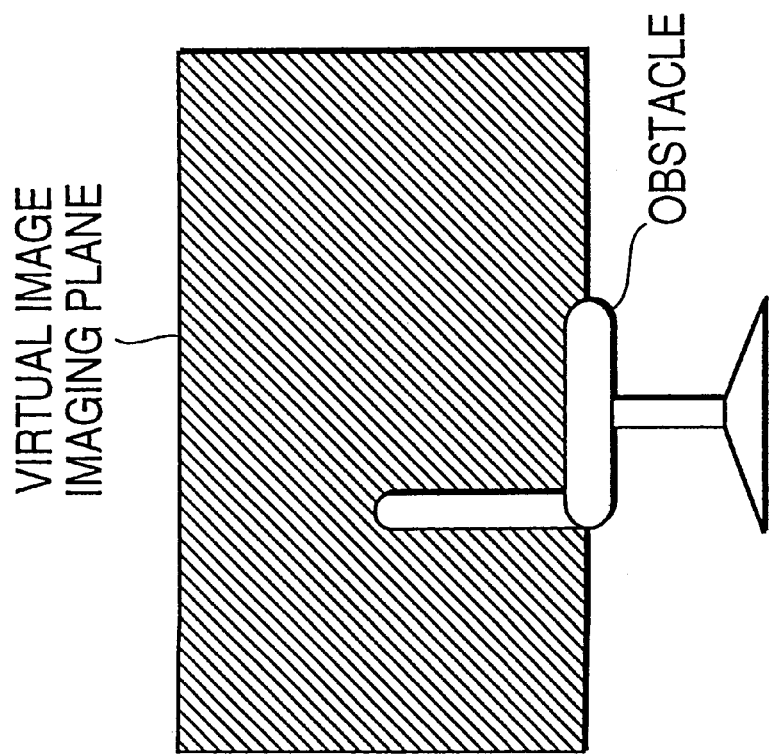
Figure 5B:
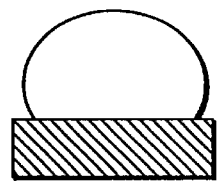
FIGS. 5A to 5D are rear, top, bottom and side views showing the virtual image visual display device.
Figure 5D:
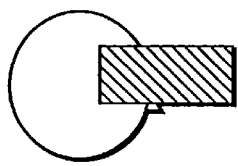
Figure 5A:
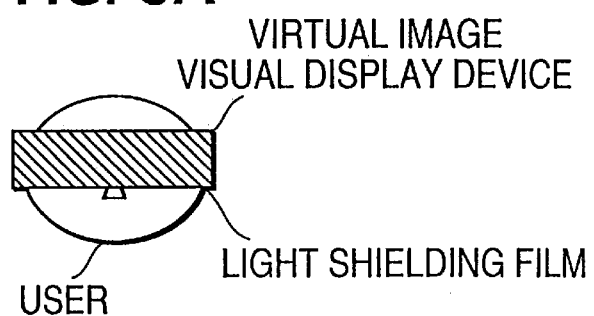
Figure 5C:
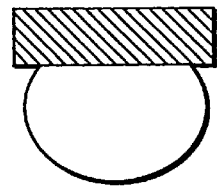
Figure 11:
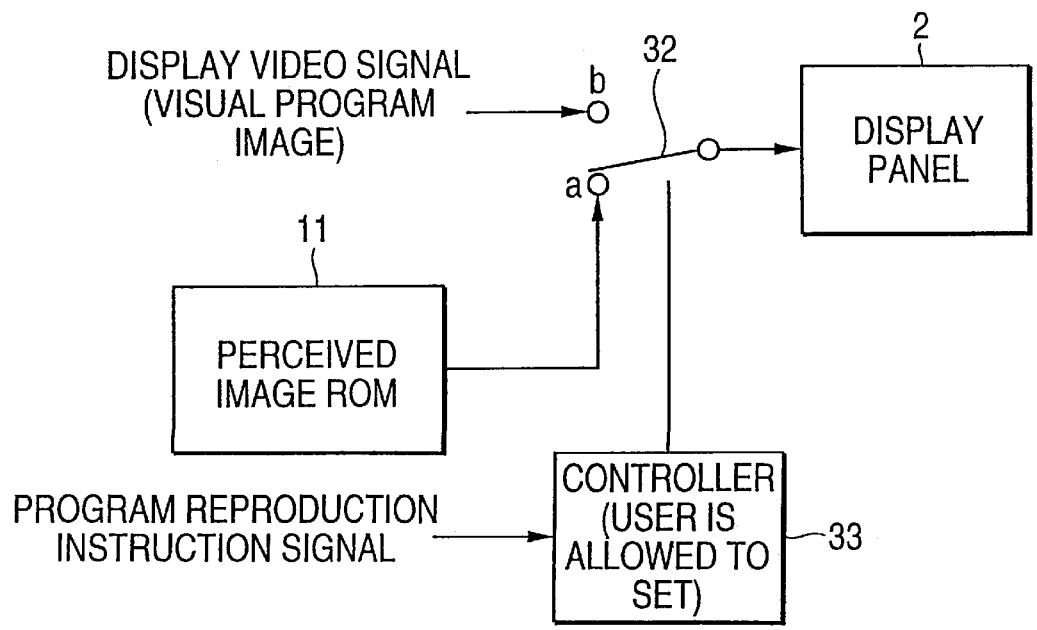
FIG. 11 is a block diagram showing an electrical construction according to a third embodiment of the virtual image visual display to which the present invention is applied.

Next, FIG. 11 shows the construction of a third embodiment of the virtual image visual display device to which the present invention is applied. In the figure, the parts corresponding to those of FIG. 4 are presented by the same reference numerals. That is, the virtual image visual display device has the same construction as that of FIG. 8 except that the RAM 12 is omitted and both a switch 32 and a controller 33 are newly provided.

The switch 32 is designed to select any one of terminals a and b on the basis of the control of the controller 33. The terminal a is supplied with the optimum perception image from the perception image ROM 11, and the terminal b is supplied with the audiovisual program image.

The controller 33 is supplied with a program reproduction instructing the signal for instructing start of the audiovisual program image, and the controller 33 is set to control the switch 32 in accordance with the program reproduction instructing signal. In addition, the controller 33 may be also set to control the switch 32 in accordance with the operation of the user.

In the virtual image visual display device thus constructed, when the user operates to start the display of the audiovisual program image, the controller 33 is supplied with the program reproduction instructing signal. Upon receiving the program reproduction instructing signal, the controller 33 controls the switch 32 to select the terminal a. As a result, the optimum perception image which is read out from the perception image ROM 11 is supplied to the display panel 2 through the switch 32 and displayed thereon. Accordingly, in this case, only the virtual image corresponding to the optimum perception image is formed.

In the case where the optimum perception image is a still picture, the controller 33 controls the switch 32 to select the terminal b when a predetermined time (the user may set this time by operating the controller 33) elapses from the display of the still picture. Further, in the case where the optimum perception image is a moving picture, when the moving picture is finished, the controller 33 controls the switch 32 to select the terminal b. As a result, the audiovisual program image supplied to the terminal b is supplied to the display panel 2 through the switch 32 and displayed thereon. Accordingly, in this case, only the virtual image corresponding to the audiovisual program image is formed.

As described above, according to the third embodiment, the optimum perception image is displayed only just before the display of the audiovisual program image is started, so that the optimum perception image can be prevented from disturbing the user's audiovisual action of the audiovisual program image.

That is, there is a case where upon the start of the audiovisual action of the audiovisual program image, a user immerses himself/herself into the audiovisual program image and thus the user's interest on the distance to the virtual image thereof and the size of the virtual image becomes little, so that the user wishes to enjoy only the audiovisual program image at all times. In this case, although this is temporary, the display of the optimum perception image together with the audiovisual program image disturbs the user's audiovisual action of the audiovisual program image.

Therefore, as described above, the optimum perception image is temporarily displayed just before the display of the audiovisual program image is started, thereby preventing the user's audiovisual action of the audiovisual program image from being disturbed, and also enabling the user to accurately recognize the distance to the virtual image corresponding to the audiovisual program image and the size of the virtual image.

In this case, both the audiovisual program image and the optimum perception image are not simultaneously displayed on the display panel, and as shown in FIG. 9, it is unnecessary to display the optimum perception image at the outside of an area where the audiovisual program image is displayed. That is, the optimum perception image can be displayed in the same area as the area where the audiovisual program image is displayed.

Further, when the optimum perception image is displayed in the same area as the area where the audiovisual program image is displayed as described above, the number of pixels of the display panel 2 can be reduced. That is, when simultaneously with the audiovisual program image, the optimum perception image is displayed at the outside of the area where the audiovisual program image is displayed as in the case of the first and second embodiments, the display panel 2 must have at least the number of pixels at which both the optimum perception image and the audiovisual program image are simultaneously displayed. On the other hand, when the optimum perception image is not displayed simultaneously with the audiovisual program image and the optimum perception image is displayed in the same area as the area where the audiovisual program image is displayed, it is sufficient for the display panel 2 to have at least the number of pixels at which only the audiovisual program image can be displayed.

Here, in the embodiment shown in FIG. 11, the RAM 12 is not provided at the front stage of the display panel 2 unlike the cases of FIGS. 8 and 10, and this is because both the audiovisual program image and the optimum perception image are not simultaneously displayed and thus it is unnecessary to composite both the audiovisual program image and the optimum perception image. However, in accordance with the relationship between a signal system (video signal system) for the audiovisual program image and the optimum perception image and a driving method for the display panel 2 serving as a display device, a memory such as a RAM may be needed at the front stage of the display panel 2 for data conversion of the audiovisual program image and the optimum perception image.

Not only a two-dimensional planar image, but also a three-dimensional stereoscopic image may be used as the perception image. A stereoscopic image may be formed by using the parallax of both eyes and variation of convergence, for example.

That is, when the virtual image visual display device is designed in a two-optical-axis type as shown in FIG. 1, independent virtual images can be observed at the right and left eyes of the user, respectively. Therefore, assuming that the virtual images observed at the left eye and the right eye are referred to as a left-eye virtual image and a right-eye virtual image respectively, if the left-eye virtual image and the right-eye virtual image are formed to the right and left sides on the same plane respectively as shown in FIG. 12A, a stereoscopic image which is relieved in front of the plane (user side) can be observed at the user side.

Figure 12A:
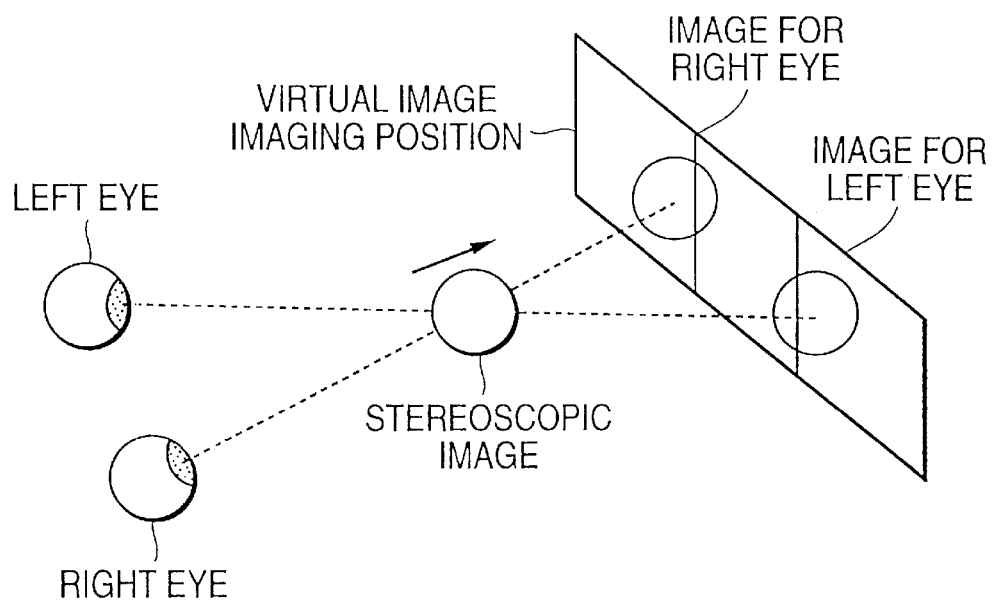
FIGS. 12A and 12B are diagrams showing stereoscopic images using the parallax between both the eyes.

Further, for example, when the left-eye virtual image and the right-eye virtual image are shifted to the left and the right respectively from the state of FIG. 12A, the stereoscopic image is shifted in a direction away from the user. When the left-eye virtual image and the right-eye virtual image are further shifted to the left and the right respectively even after the left-eye virtual image and the right-eye virtual image are coincident with each other on the same plane, the stereoscopic image which is relieved to the depth side from the plane is observed at the user side as shown in FIG. 12B.

Figure 12B:
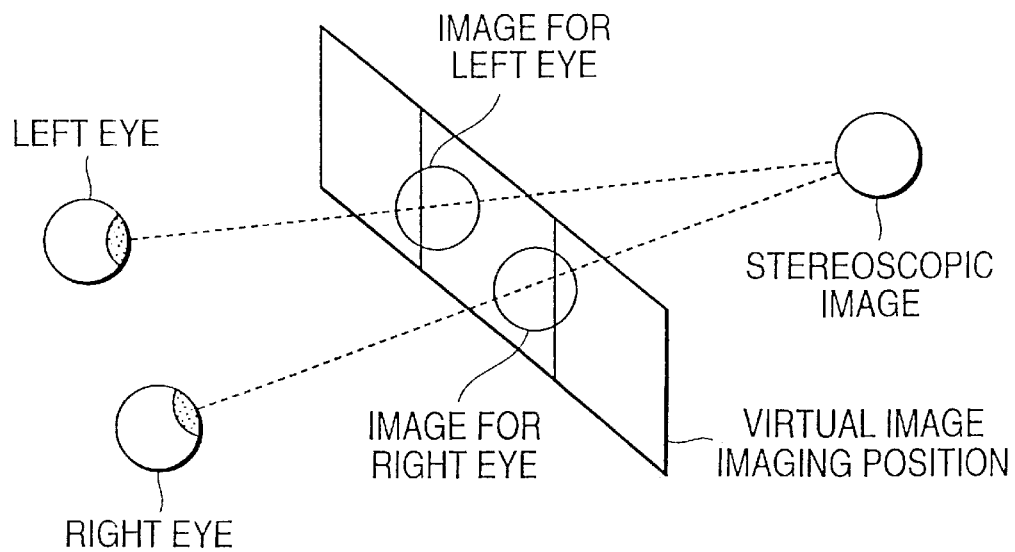

Further, when the left-eye virtual image and the right-eye virtual image are shifted to the right and the left respectively from the state of FIG. 12B, the stereoscopic image is shifted in the opposite direction to that described above so that it approaches to the user.

Accordingly, a stereoscopic image which moves far away from the user or a stereoscopic image which approaches to the user can be formed by shifting to the right and left directions on the same plane the positions at which the left-eye virtual image and the right-eye virtual image are formed.

By using such a stereoscopic image as a perception image, the user can also accurately recognize the distance to the virtual image corresponding to the audiovisual program image and the size of the virtual image.

The stereoscopic image can be applied as the perception image in any embodiment as described above.

In the above stereoscopic vision due to the parallax of both the eyes, the convergence of both eyes of the user is adjusted to the direction of the stereoscopic image, and the adjustment of the focus is performed not to be matched with the stereoscopic image, but to be matched with the left-eye virtual image and the right-eye virtual image. As described above, the adjustment of the focus is not carried out on the stereoscopic image, so that it causes fatigue to enjoy a stereoscopic image due to the parallax of both the eyes for a long time.

Therefore, when the stereoscopic image obtained by utilizing the parallax of both eyes is used as a perception image, it is desirable to prevent the user from observing the perception image for a long time.

Next, the stereoscopic image as the perception image may be formed by the following manner in addition to the method using the parallax of both the eyes.

Figure 13:
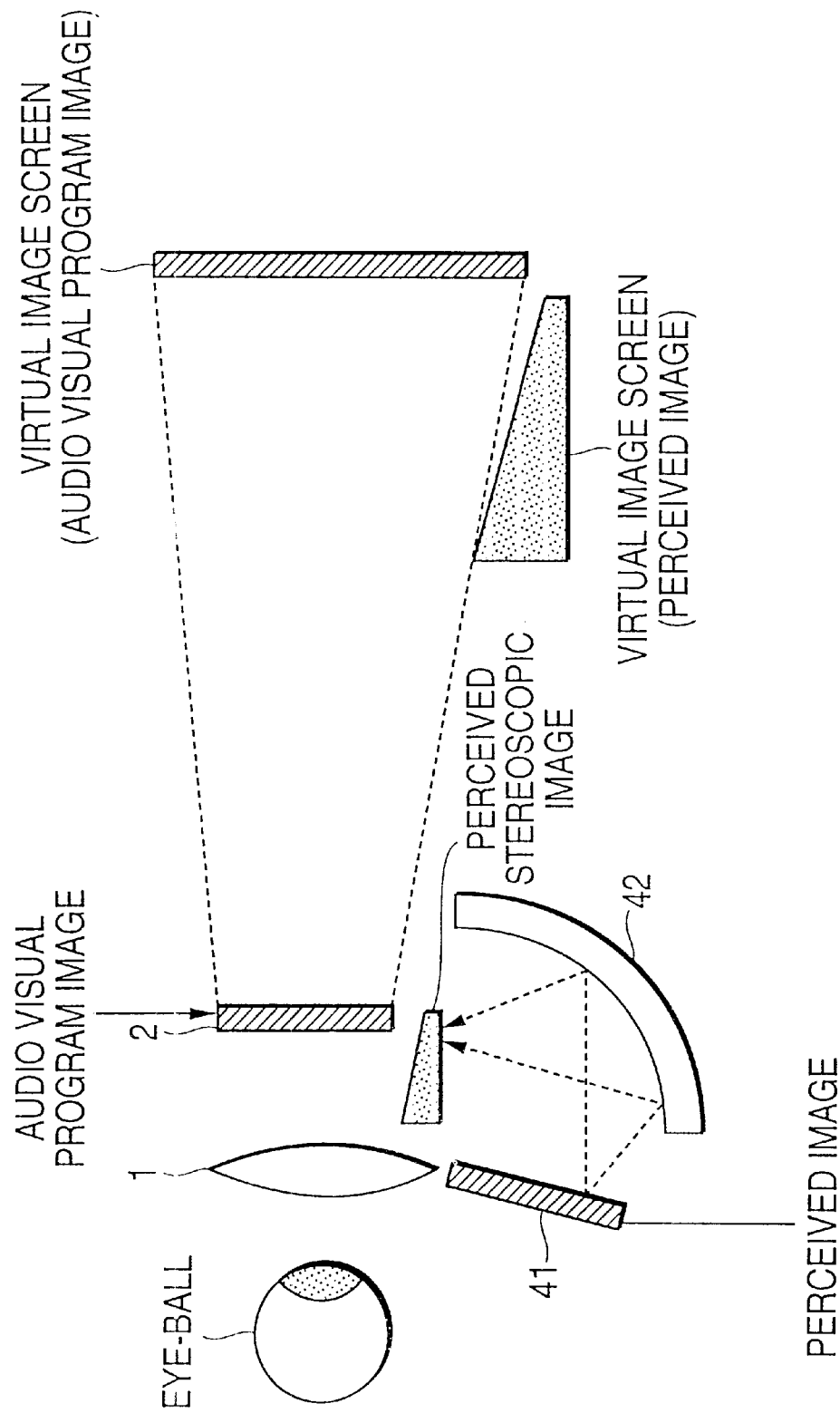
FIG. 13 is a diagram showing an optical construction of a fourth embodiment of the virtual image visual display device to which the present invention is applied.

That is, FIG. 13 shows the construction of a fourth embodiment of the virtual image visual display device to which the present invention is applied.

In this embodiment, in addition to the display panel 2 for displaying the audiovisual program image (display panels 2L and 2R) and the lens 1 (lenses 1L and 1R) for enlarging the audiovisual program image to form a virtual image are provided a display panel 41 for displaying a perception image and a semi-spherical mirror 42 (forming means) for forming a stereoscopic image by reflecting light as the perception image.

The light as an image obtained by making stereoscopic a perception image formed by the semi-spherical mirror 42 (hereinafter suitably referred to as perception stereoscopic image) is enlarged by the lens 1, and incident to the eye balls of the user, thereby enabling the virtual image corresponding to the perception stereoscopic image to be enjoyed.

That is, in this embodiment, the user can enjoy the virtual image corresponding to the audiovisual program image, which is formed by enlarging the audiovisual program image displayed on the display panel 2 through the lens 1. As described above, the distance to the virtual image corresponding to the audiovisual program image and the size of the virtual image are determined by the positional relationship between the lens 1 and the display panel 2, and the user enjoys the virtual image at the size and distance thus determined.

Further, in this case, the user can enjoy through the lens 1 the virtual image corresponding to the perception stereoscopic image which is formed by reflecting from the semi-spherical mirror 42 the perception image displayed on the display panel 41 different from the display panel 2.

Here, it is known that the image which is formed (projected) by reflecting the light from the semi-spherical mirror 42 (here, the perception stereoscopic image) is viewed as being relieved in the space, and thus the virtual image corresponding to such a perception stereoscopic image makes the user feel depth greatly.

In FIG. 13, the perception stereoscopic image is formed at the front side, viewed from the user, of the display panel 2 on which the audiovisual program image is displayed, that is, at a position near to the lens 1 side, whereby the virtual image corresponding to the perception stereoscopic image is formed in front of the virtual image corresponding to the audiovisual program image by the lens 1. Further, in FIG. 13, the perception stereoscopic image is formed at the lower side, viewed from the user, of the display panel 2 on which the audiovisual program image is displayed, whereby the virtual image corresponding to the perception stereoscopic image is formed at the lower portion of the virtual image corresponding to the audiovisual program image by the lens 1.

Figure 14:
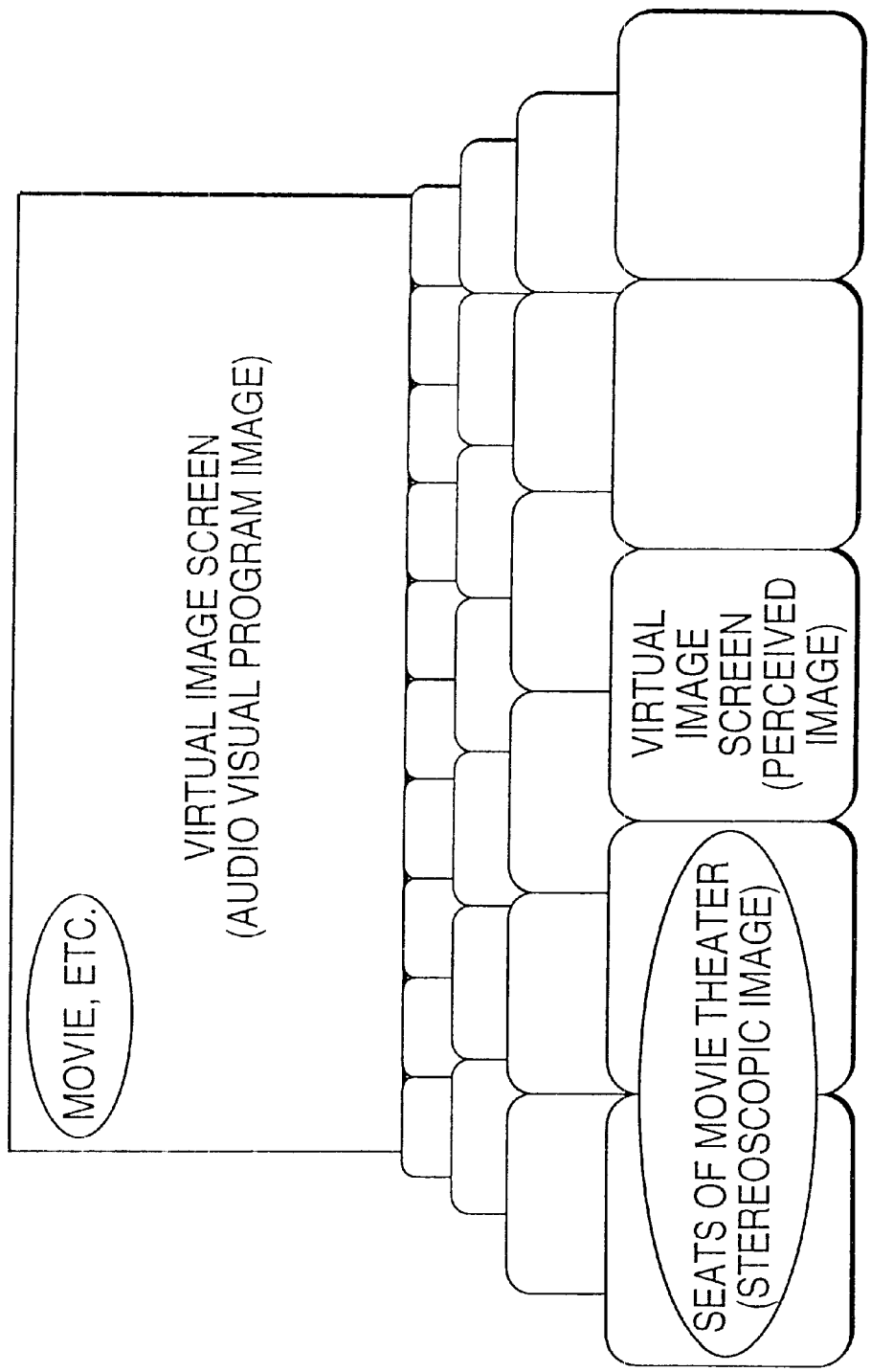
FIG. 14 is a diagram showing a virtual image which can be observed by the virtual image visual display device shown in FIG. 13.

Accordingly, for example when an image containing the seats of a movie theater, etc. is displayed as a perception image, the user can not only enjoy the virtual image corresponding to the audiovisual program image, but also see a virtual image having depth corresponding to a perception stereoscopic image having the seats of the movie theater, etc. displayed therein at the lower side in front of the virtual image as shown in FIG. 14.

Accordingly, in this case, the user can accurately recognize the distance to the virtual image corresponding to the audiovisual program image and the size of the virtual image by the psychological effect due to the virtual image corresponding to the perception stereoscopic image, and also the user can feel such realism as if the user enjoy the audiovisual program image in the movie theater.

The distance to the virtual image corresponding to the audiovisual program image and the size of the virtual image are determined by the positional relationship between the lens 1 and the display panel 2 as described above, so that the distance to the virtual image and the size of the virtual image can be varied by changing the positional relationship. Further, the size of the virtual image may be varied by changing the size of the image displayed on the display panel 2. Therefore, in the virtual image visual display device in which the distance to the virtual image and the size of the virtual image can be varied, plural patterns are prepared for a perception image, and a perception image to be used may be determined on the basis of the distance to the virtual image corresponding to the audiovisual program image and the size of the virtual image. In this case, realism under various conditions can be obtained.

Next, FIGS. 15A to 15E show the cross-section (FIG. 15A) and the outlook (FIGS. 15B to 15E) of the virtual image visual display device.

In the embodiment of FIG. 13, the display panel 41 for displaying a perception image and the semi-spherical mirror 42 for forming a perception stereoscopic image are provided at the lower side of the lens 1 and the display panel 2, and thus these portions are covered by a light shielding film.

When the virtual image corresponding to the perception stereoscopic image is formed, for example, as shown in the cross-sectional view of FIG. 16A, the display panel 41 and the semi-spherical mirror 42 may be provided at the upper side of the lens 1 and the display panel 2. Here, the outlook construction of the virtual image visual display device in this case is shown in FIGS. 16B to 16E.

As described above, when the outside light external is shielded and the virtual image corresponding to the audiovisual program image is supplied, the virtual image corresponding to the perception image is supplied (exhibited). Therefore, there is prevented occurrence of such inconsistency that an obstacle in front of a virtual image is hidden behind the virtual image and thus it cannot be seen, and also by using the psychological effect serving as an important assistance to perceive the distance to the virtual image corresponding to the audiovisual program image and the size of the virtual image, the user is enabled to accurately recognize the distance and the size and to be supplied with a virtual image with realism.

Figure 17:
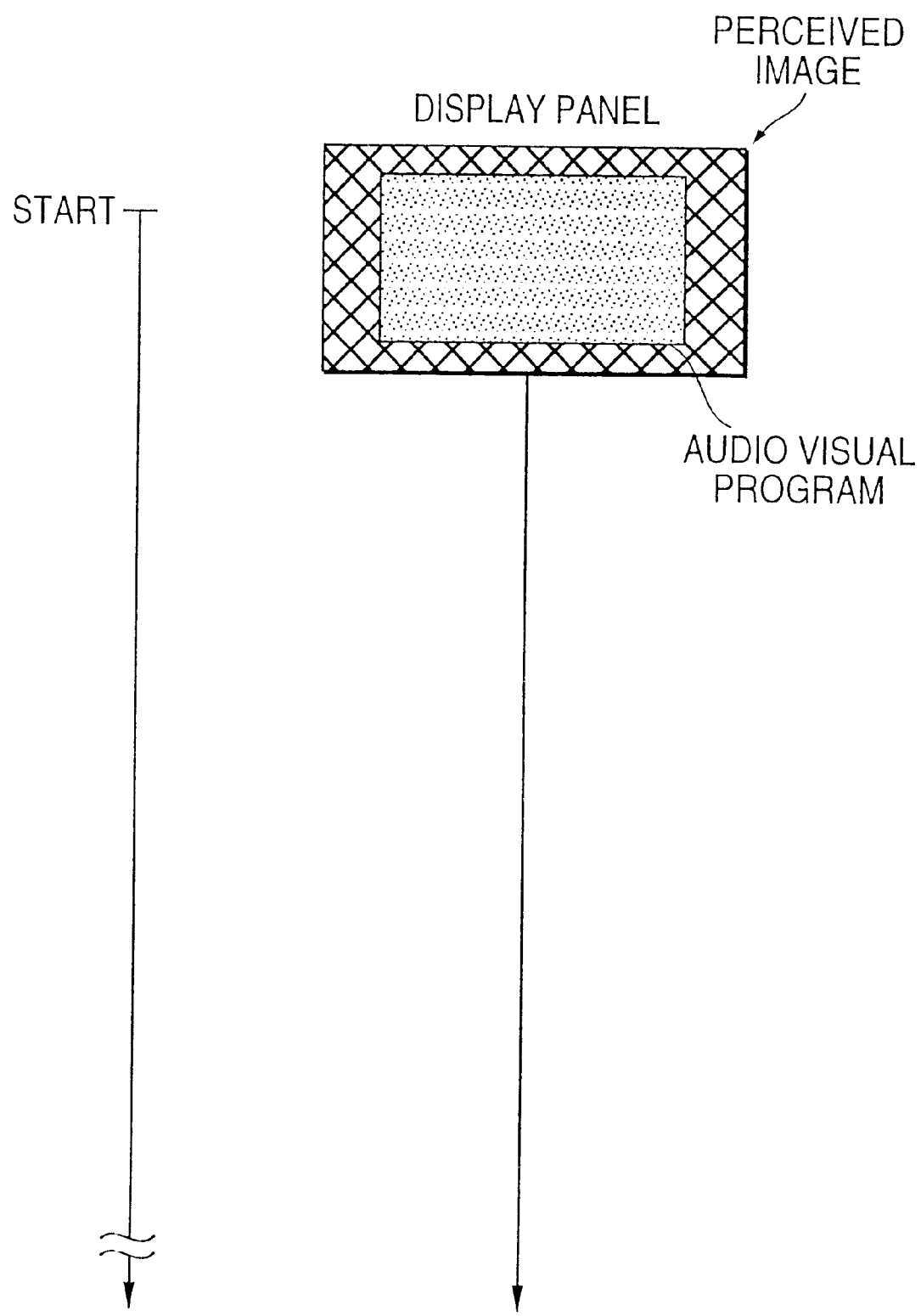
FIG. 17 is a diagram showing a first time variation of the display of a perception image.

In the embodiment shown in FIG. 8, the display of the perception image is started simultaneously with the start of the audiovisual program image, and then the perception image is displayed until the audiovisual program image is finished as shown in FIG. 17.

Figure 18:
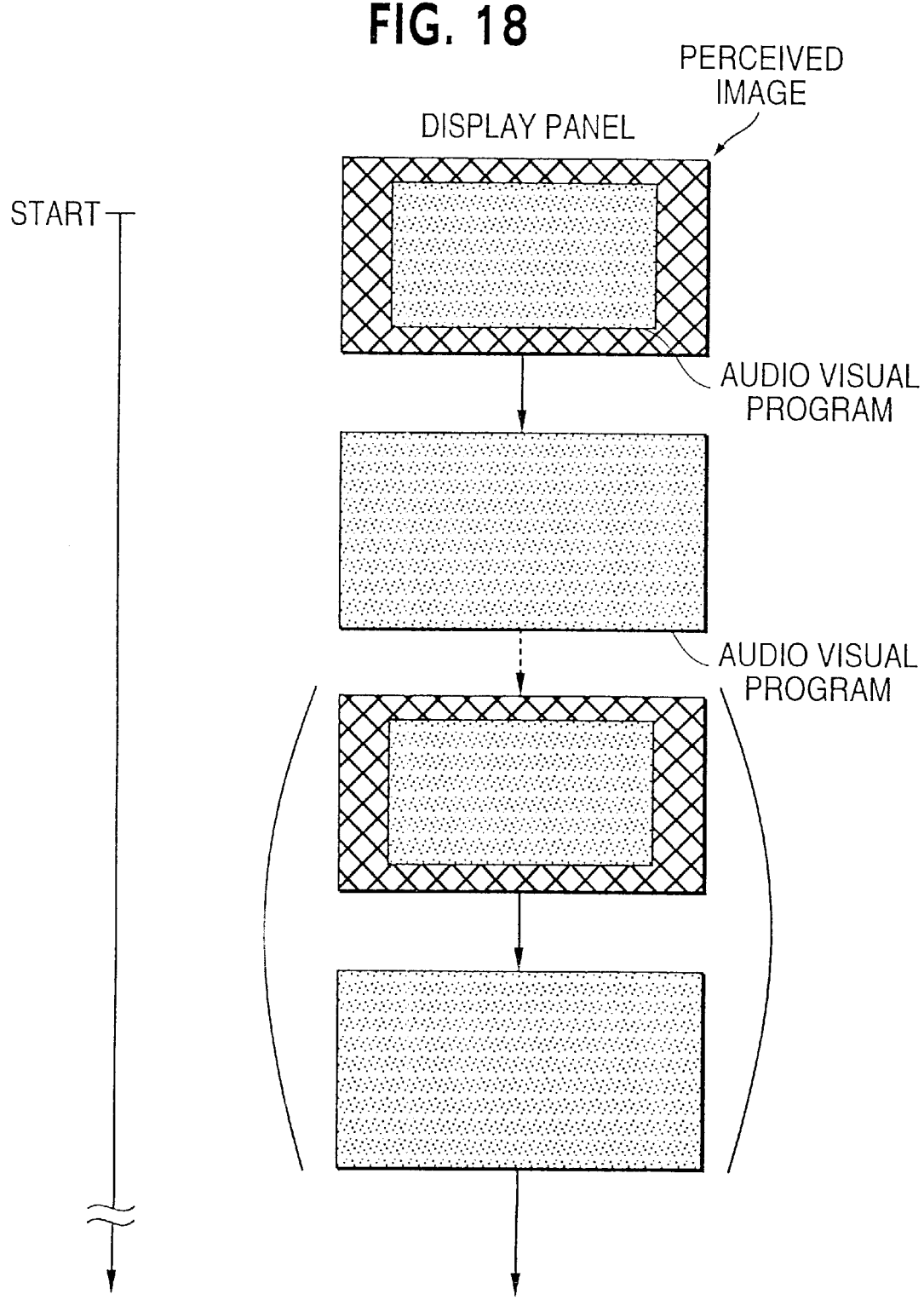
FIG. 18 is a diagram showing a second time variation of the display of the perception image.

In the embodiment shown in FIG. 10, the display of the perception image is started simultaneously with the start of the audiovisual program image, and then the perception image is deleted when a predetermined time (the time corresponding to the above storage time) elapses as shown in FIG. 18. As an application of the display method of the perception image as described above, for example, after the deletion of the perception image, the display of the perception image may be started at a predetermined timing again, and then it may be deleted after a predetermined time elapses. That is, the perception image may be displayed periodically as shown in parentheses of FIG. 18.

Figure 19:
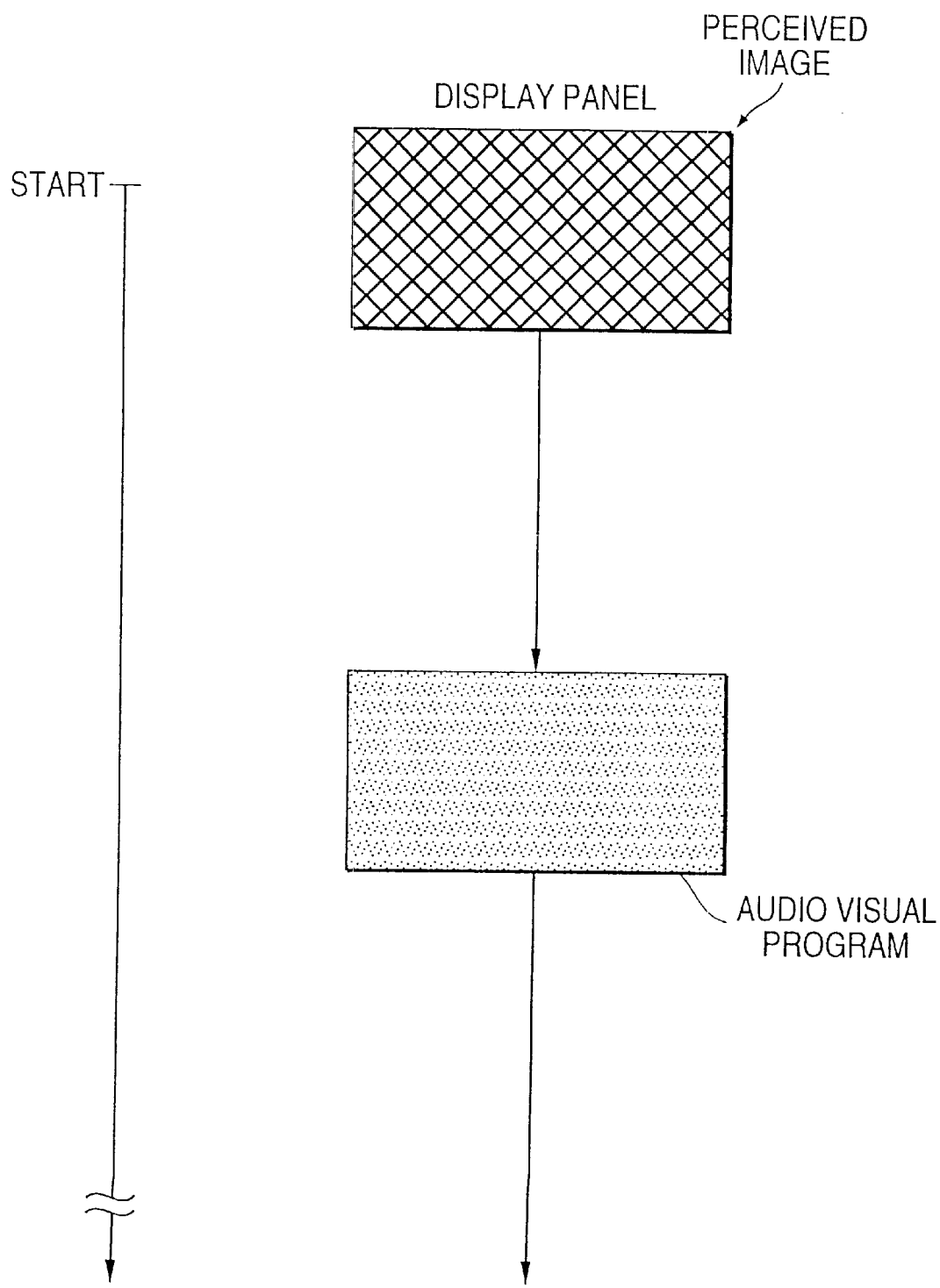
FIG. 19 is a diagram showing a third time variation of the display of the perception image.

In the embodiment shown in FIG. 11, only the perception image is first started, and then only the audiovisual program image is displayed as shown in FIG. 19. That is, any of the audiovisual program image and the perception image is displayed solely, and the perception image is displayed only just before the display of the audiovisual program image is started.

In the above embodiments, no specific description is made on the size of the perception image. According to the experiments which have been by the inventor, as the size of the display area thereof is larger, the user can more accurately recognize the distance, etc. Accordingly, from the viewpoint of the distance recognition, the visual image is preferably larger. However, the size of the visual image is large, it disturbs the user's audiovisual action of the audiovisual program image.

Figure 20:
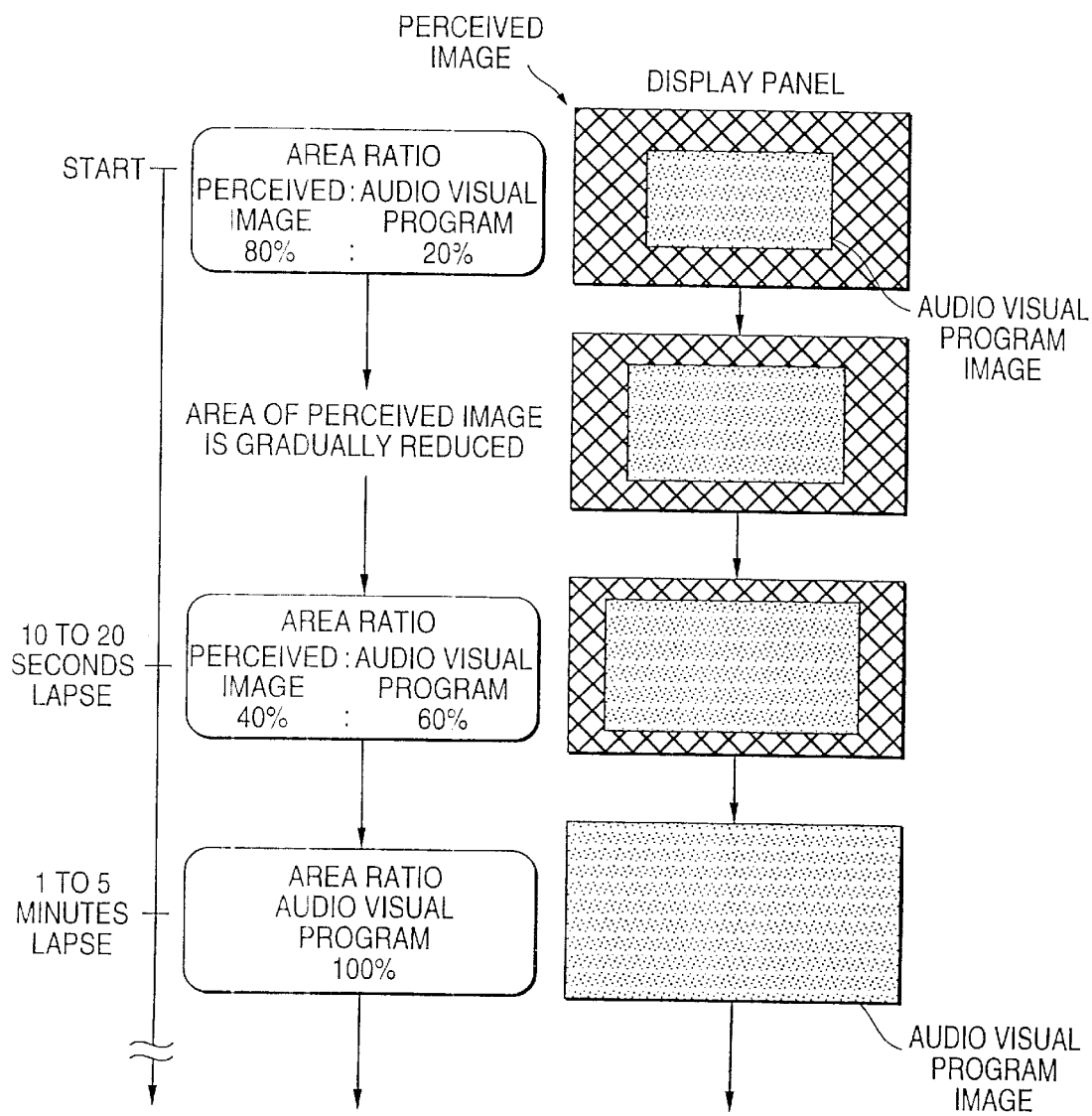
FIG. 20 is a fourth time variation of the display of the perception image.

Therefore, the audiovisual program image and the perception image can be displayed as shown in FIG. 20.

That is, the audiovisual program image is first displayed as being small (for example, it is displayed while the display area thereof is reduced to a small display area), and also the perception image is displayed as being large (for example, it is displayed on a large display area with no reduction and no enlargement). Specifically, for example, the audiovisual program image or the perception image is displayed at a size of 20% or 80% of the whole display area.

Thereafter, the audiovisual program image is enlarged in size and the perception image is reduced in size as the time elapses. Specifically, for example, the size of the audiovisual program image or the perception image is varied so that the size is reduced to the size of about 60% or 40% of the whole display area in about 10 to 20 seconds. Further, only the audiovisual program image is displayed after a predetermined time of 1 to 5 minutes elapses from the start of the display.

As described above, when the display areas of the audiovisual program image and the perception image are varied, the effect of the distance recognition which is provided to the user by the perception image can be adjusted, so that the distance recognition can be efficiently provided to the user and also the disturbance of the user's audiovisual action of the audiovisual program image can be prevented.

In the embodiment shown in FIG. 10, the display areas of the audiovisual program image and the perception image can be easily varied by making the timing controller 21 (control means) electrically enlarge/reduce the audiovisual program image and the perception image stored in the RAM 12 (on the other hand, when the display areas of the audiovisual program image and the perception image are optically varied, an optical part, etc. are required and this is inconvenient).

Figure 21:
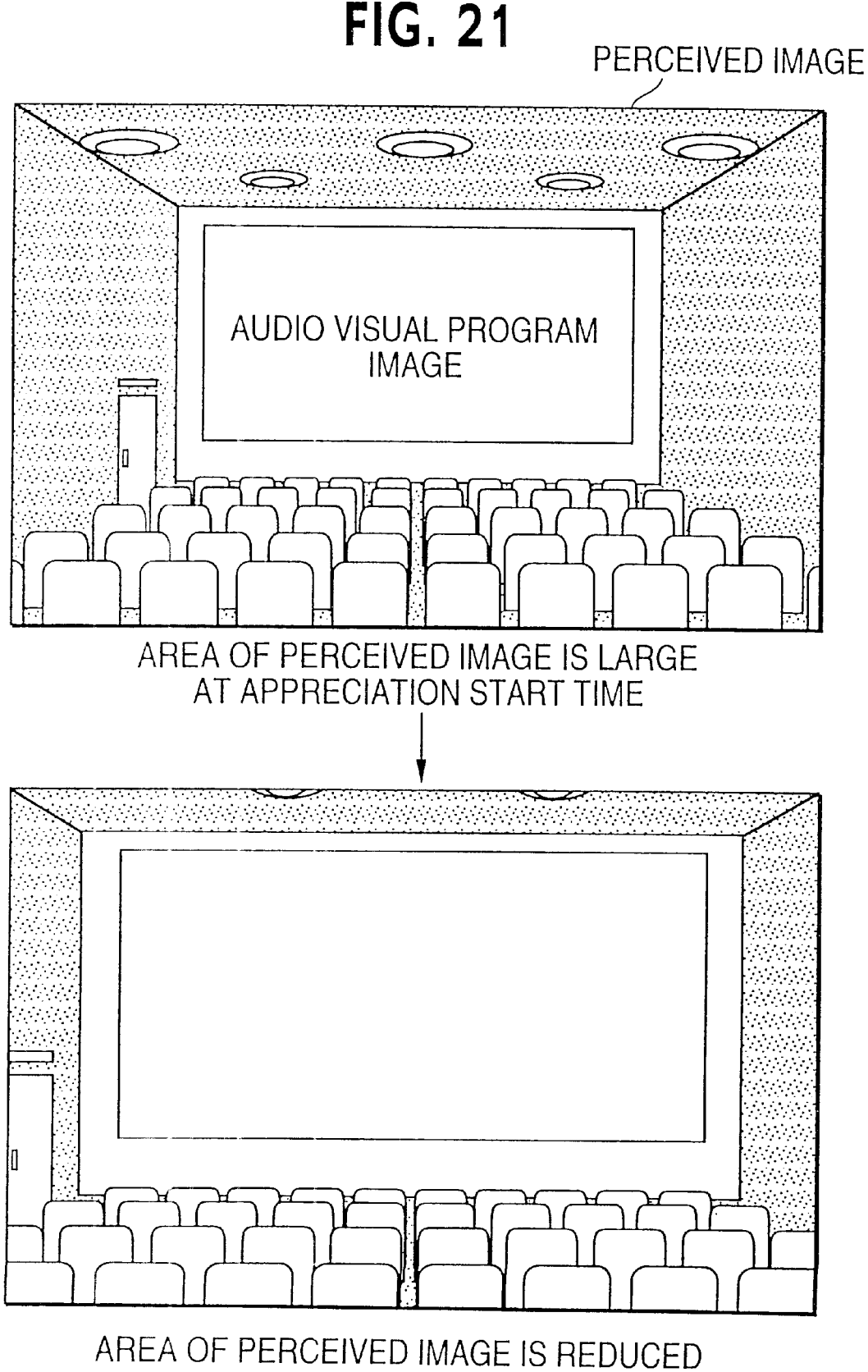
FIG. 21 is a diagram showing a perception image in which the interior of a movie theater is displayed.

FIG. 21 shows a display in the case where the display area is varied by using an image of the interior of a movie theater as a perception image. In this case, the user can perceive the distance to the audiovisual program image and the size of the audiovisual program image, and also the user can have such a feel as if he/she is in a movie theater.

When the virtual image visual display device is of a two-optical-axis type, seats and walls of the movie theater which are displayed in the perception image are set to have parallax between both the right and left eyes, whereby the seats and the walls can be stereoscopically recognized. Therefore, the distance recognition to the audiovisual program image can be more enhanced.

The perception image is not limited to the movie theater, and it may be any one of a moving picture and a still picture.

Figure 22A:
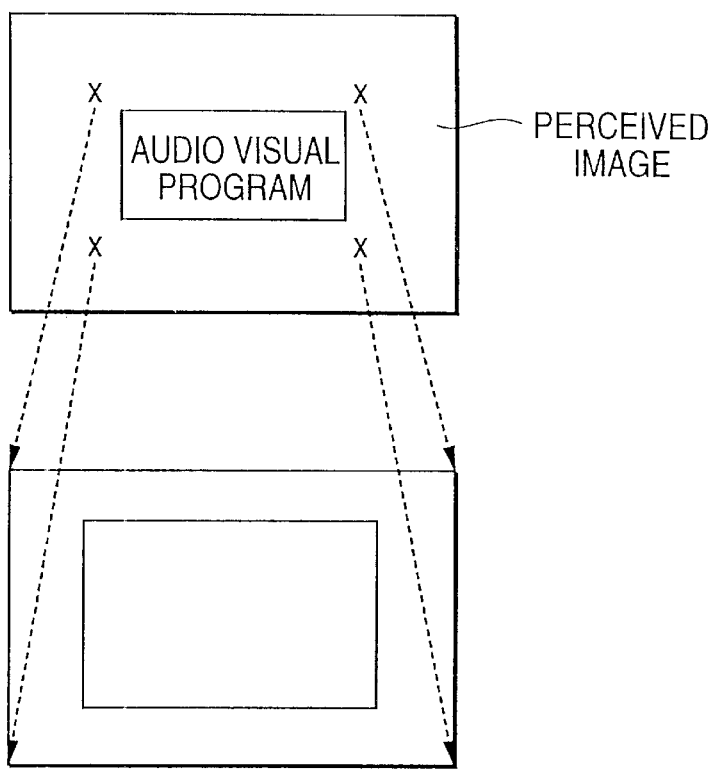
FIG. 22 is a diagram showing the way how to vary the display areas of an audio visual program image and a perception image.
Figure 22B:
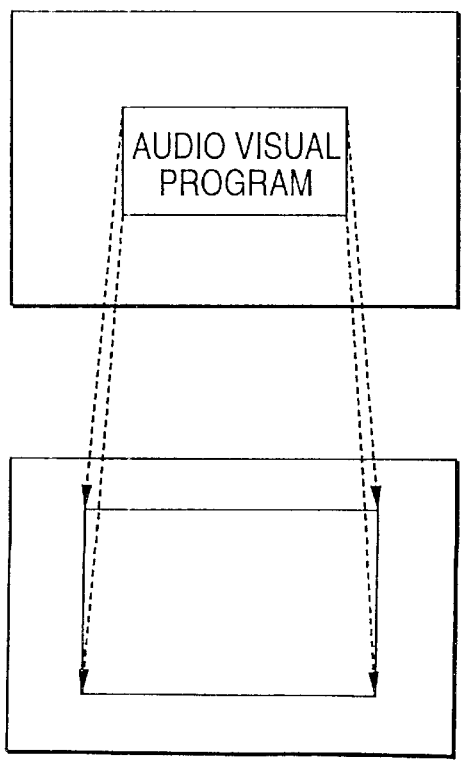

Further, as a method of varying the display area (size) of each of the audiovisual program image and the perception image may be adopted a method of enlarging the overall audiovisual program image and a part of the perception image or a method of enlarging only the audiovisual program image to relatively increase the size of the audiovisual program image and reduce the size of the perception image. FIG. 22A and/or FIG. 22B are schematic figures of these methods. Further, a method of reducing only the perception image to relatively increase the size of the audiovisual program image and reduce the size of the perception image may be adopted. However, in this case, the absolute size of the audiovisual program image is not varied, and thus it is difficult to display the audiovisual program image with high precision. That is, since the overall display area is fixed, it is preferable that at least the absolute size of the audiovisual program image is increased in order to finally display the audiovisual program image with high precision.

Further, in FIG. 20, the audiovisual program image and the perception image are displayed from the initial stage. However, only the perception image may be displayed from the initial stage.

Still further, in FIG. 20 the perception image is finally deleted, and only the audiovisual program image is displayed. However, the perception image may be finally left displayed in a small display area together with the audiovisual program image.

In the above embodiments, the virtual image which is formed by enlarging the image displayed on the display panel 2 with the lens 1 is enjoyed. However, a virtual image which is formed by the lens 1 may be reflected from a half mirror or the like, whereby an image thus obtained is enjoyed.

Further, in the above embodiments, the lens 1 which is a concave lens is used as the enlarging optical system for forming a virtual image. However, a convex mirror or the like may be used as the enlarging optical system.

Still further, in the above embodiments, the virtual image visual display device is of a two-optical-axis type, however, the present invention may be applied to a one-optical-axis type virtual image visual display device.

Still further, in the above embodiments, the perception image is displayed at the right or left side of the audiovisual program image or below the audiovisual program image, however, the display position of the perception image is not limited to a specific position.

According to the display device and the display method of the first and second aspects of the present invention, there is formed the virtual image corresponding to a perception image to make a user perceive the distance to a virtual image corresponding to a reception image or the size of the virtual image. Accordingly, the user can accurately recognize the distance to the virtual image corresponding to the reception image or the size of the virtual image, so that the realism obtained by observing the virtual image can be enhanced.

What is claimed is:

1. A display device including:

display means for displaying a received reception image;

an enlarged optical system for enlarging the reception image displayed on said display means to form a virtual image, whereby outside light is shielded to supply the virtual image;

storage means for storing a perception image which makes a user perceive the distance to the virtual image corresponding to the reception image or the size of the virtual image; and a control means that controls a time period over which the perception image is displayed, wherein said enlarging optical system forms the virtual image to correspond with the perception image.

2. The display device as claimed in claim 1, wherein said display means displays the perception image at the peripheral portion of the reception image, and wherein said enlarging optical system forms the reception image displayed on said display means and the virtual image corresponding to the perception image.

3. The display device as claimed in claim 1, wherein said control means performs a control operation so that the virtual image corresponding to the perception image is periodically supplied.

4. The display device as claimed in claim 1, wherein said control means controls the display area of the reception image or the perception image.

5. The display device as claimed in claim 4, wherein said control means increases the display area of the reception image after the supply of the virtual image corresponding to the reception image is started.

6. The display device as claimed in claim 4, wherein said control means reduces the display area of the perception image after the supply of the virtual image corresponding to the perception image is started.

7. The display device as claimed in claim 1, wherein said enlarging optical system forms the virtual image corresponding to the perception image only just before the display of the reception image by said display means is started.

8. The display device as claimed in claim 1, further including forming means for forming a stereoscopic image obtained by making the perception image stereoscopic, said enlarging optical system forming the virtual image corresponding to the stereoscopic image.

9. The display device as claimed in claim 1, wherein said control means includes a switch that stops display of the perception image after a predetermined time has elapsed from the start of the display of both the virtual image and the perception image.

10. The display device as claimed in claim 9, wherein the predetermined time is set by the user.

* * * * *